Jan. 28, 1930.  F. P. ELLSWORTH  1,745,086
POWER TRANSMISSION FOR MOTOR VEHICLES
Filed May 17, 1927   3 Sheets-Sheet 2
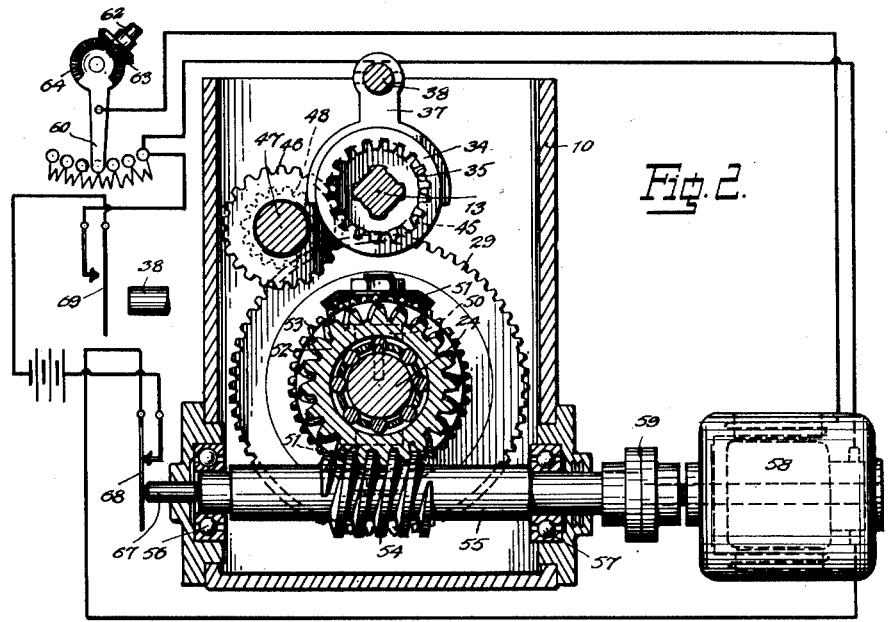
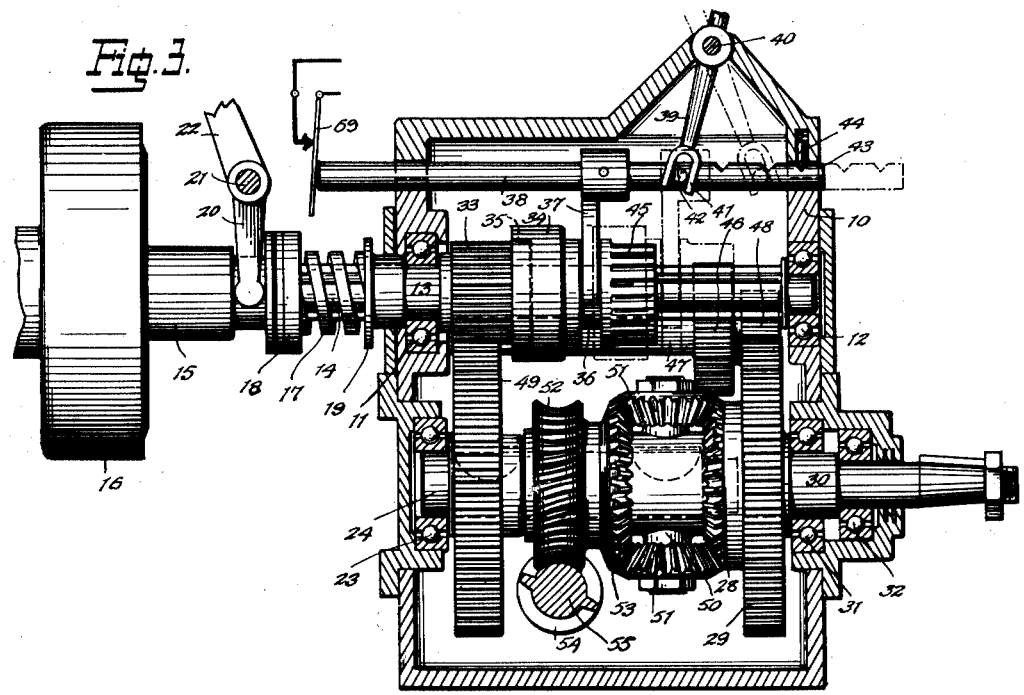
INVENTOR.
FRANCIS P. ELLSWORTH.
BY
ATTORNEY Jan. 28, 1930.    F. P. ELLSWORTH    1,745,086
POWER TRANSMISSION FOR MOTOR VEHICLES
Filed May 17, 1927    3 Sheets-Sheet 3

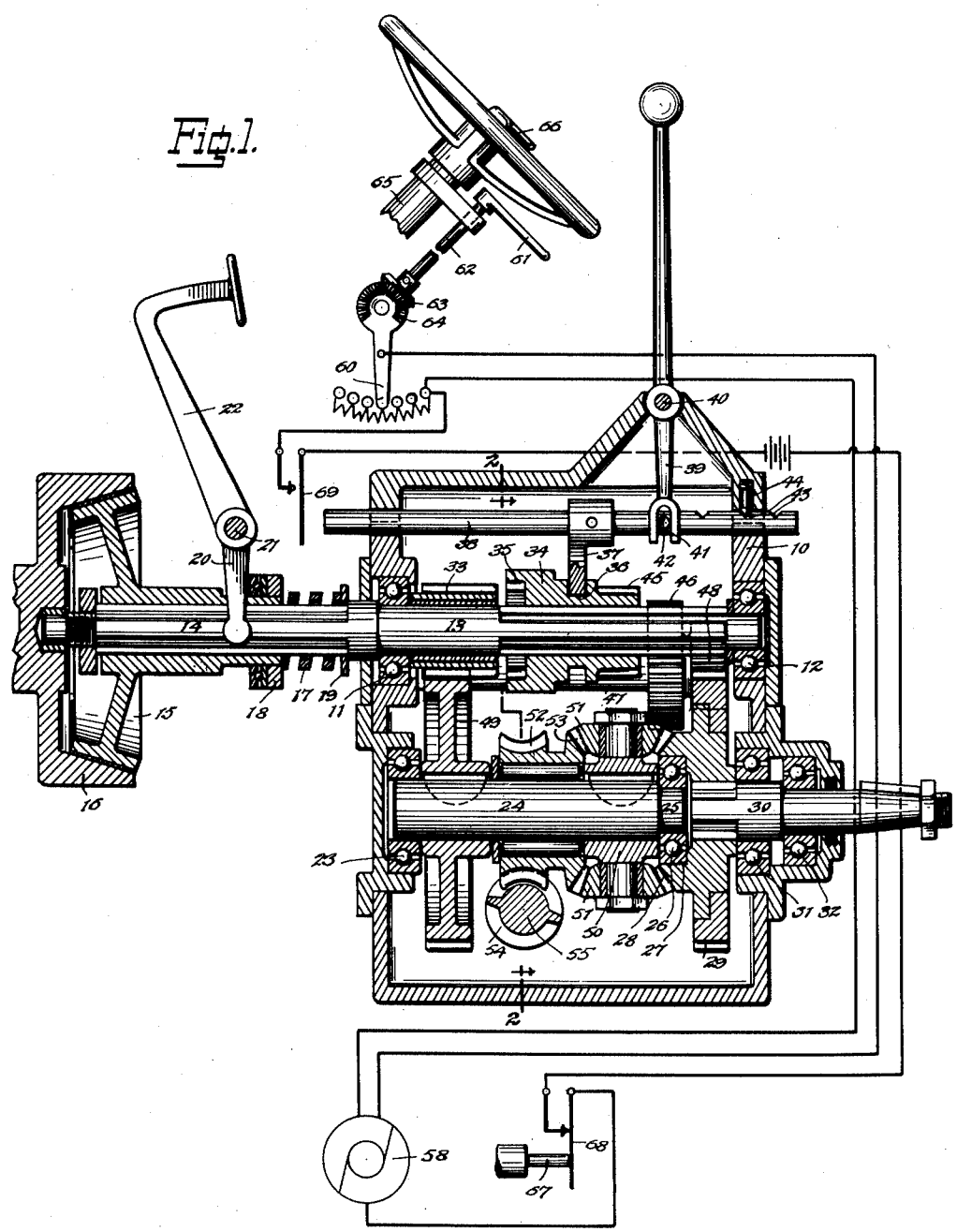

INVENTOR.
FRANCIS P. ELLSWORTH.
BY
ATTORNEY.

Patented Jan. 28, 1930

1,745,086

UNITED STATES PATENT OFFICE

FRANCIS P. ELLSWORTH, OF NEW YORK, N. Y.

POWER TRANSMISSION FOR MOTOR VEHICLES

Application filed May 17, 1927. Serial No. 192,039.

The present invention relates to power transmission for motor vehicles and has for an object to provide an improved transmission mechanism for varying the speed ratio between the source of motor power and the propeller shaft, in which the usual operations of manipulating a clutch release pedal and a gear shift lever are eliminated, and in which there is an automatic speed torque control in direct relation with the engine speed.

Another object consists in providing such a mechanism in which a differential gear train is arranged to vary the speed through a continuously progressive range, as distinguished from the ordinary known type of three or four speed sliding transmission gears, and further to provide such a mechanism in which a constant value of the driving part speed is absorbed, to the end that the vehicle will remain stationary at a certain speed of the engine, say the idling speed, and upon increase of the engine speed, the gear ratio increases automatically from zero in mathematical ratio, so that the motor vehicle may be operated from a stand-still to maximum speed and under the proper speed torque merely by manipulation of the engine throttle.

In motor vehicles as at present constructed, the various gear ratios necessary in the operation of the vehicle are commonly obtained through the use of sliding gear transmissions which usually contain gears for three forward speeds, the change in ratio being accomplished by disconnecting the driving motor by means of a pedal operated clutch, and then operating a hand lever to move the desired gears into or out of engagement. In the performance of these operations considerable skill and experience is required to permit a proper shifting of gears to change from a higher to a lower gear ratio. This necessity for close attention to the manner of shifting gears makes the driving of a motor vehicle somewhat difficult to learn, distracts the driver's attention from the road, makes driving in heavy traffic, where frequent shifting of gears is necessary, very fatiguing, and causes loss of momentum during the period of clutch disengagement, and unevenness of motion.

I am aware that transmission mechanisms have been provided in which intermediate or auxiliary power has been applied to the prime mover as a booster to give the proper proportion of power for the tractive effort under varying loads, and to provide an increase in torque at starting, and in my co-pending application S. N. 175,035, filed March 14, 1927, I have disclosed a type of transmission in which a differential release or escapement is provided which is controlled to permit a full absorption of the motive power and a gradual release thereof to the driven propeller shaft under positive control by the driver. In the embodiment disclosed in my co-pending application the gear ratio is reduced or increased by the comparatively simple operation of pressing a foot lever. In the present conception the manual control of the gear ratio is eliminated, the control being entirely automatic and the function of the transmission itself. This feature may be called automatic speed torque control, and is comparable in its results to the automatic speed torque control obtained through the use of series wound D. C. or similar electric motors.

With the above and other objects in view, an embodiment of the invention is shown in the accompanying drawings, and this embodiment will be hereinafter more fully described with reference thereto, and the invention will be finally pointed out in the claims.

In the drawings:

Fig. 1 is a longitudinal vertical sectional view of a transmission mechanism according to the present embodiment of the invention, the gears being shown in their neutral or disengaged position, and showing diagrammatically the electric circuit of the control means.

Fig. 2 is a transverse vertical sectional view, taken along the line 2—2 of Fig. 1, looking in the direction of the arrows.

Fig. 3 is a side elevation of the transmission gearing, the transmission case being shown in vertical section, showing in full lines the forward-speed engaged relation of the gearing, and showing in dot-and-dash lines the reverse-speed engaged relation of the gearing.

Figure 4:
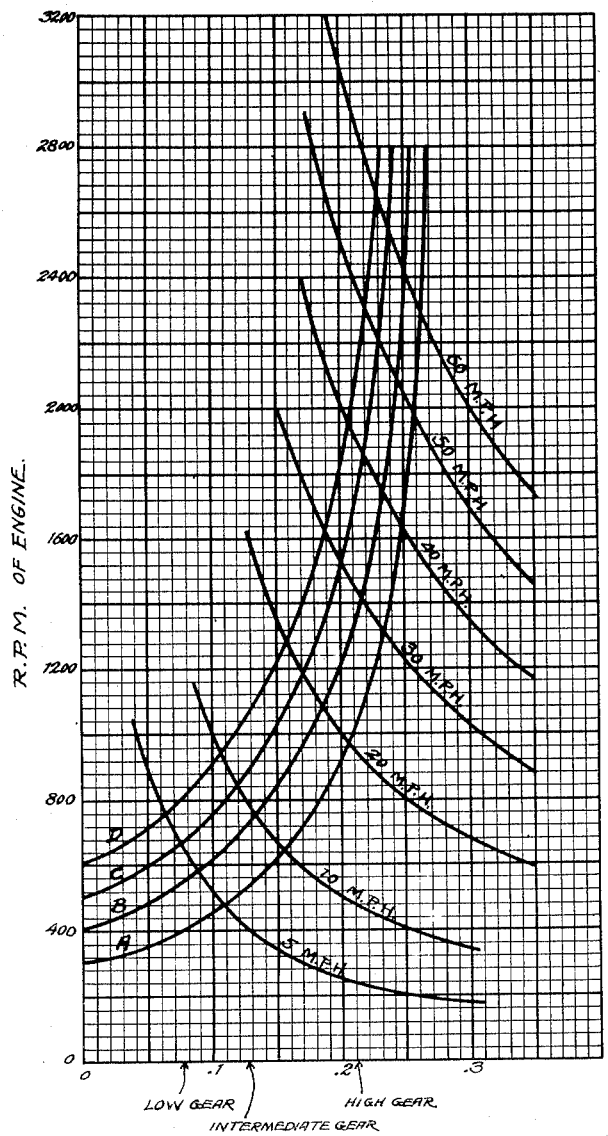
Fig. 4 is a graph showing the speed and transmission characteristic curves.

Referring to the drawings, the transmission mechanism, according to the present embodiment of the invention, comprises a transmission frame or case 10, provided in the upper portion of its front and rear walls with bearings 11 and 12, in which the driving shaft 13 is journaled, a splined end 14 of said shaft projecting forwardly toward the engine, and having slidably engaged thereon a cone clutch member 15 normally pressed into engagement with the other clutch member 16 connected to the engine by means of a spring 17 disposed between the collar 18 secured upon the end of the inner clutch member 15, and a collar 19 secured upon the inner end of the splined shaft portion 14. A fork 20 is pivotally mounted upon a support 21, and is provided with a foot pedal 22 adapted upon being pressed downwardly to cause the fork to bear against the collar 18 to compress the spring 17 and disengage the clutch members 15 and 16.

The transmission housing is also provided in its front wall and directly below the bearing 11, with a bearing 23 in which the forward end of a countershaft 24 is journaled, this shaft terminating within the housing and being provided at its rearward end with a reduced stud portion 25 journaled in a bearing 26 disposed in an annular recess 27 provided upon the face of a combination driven gear, including a bevelled gear portion 28 and an enlarged spur gear portion 29, this combination gear being secured upon the splined inner end of the stepped propeller shaft 30 journaled in stepped bearings 31 and 32 mounted in the rearward wall of the transmission housing directly below the bearing 12.

A driving pinion 33 is loosely mounted upon the forward end of the driving shaft 13 adjacent the bearing 11, said shaft being splined along its length between said driving pinion and the bearing 12, and having slidably mounted thereon a clutch member 34 having internal teeth 35 at its forward end adapted upon forward shifting of the clutch member to engage the pinion 33 to thereby connect the latter and the driving shaft as indicated in full lines in Fig. 3.

The clutch member is provided with an annular groove 36 engaged by a fork member 37 carried upon the longitudinally movable slide shaft 38, and through shifting of which the clutch is adapted to be moved from its neutral position, as indicated in Fig. 1, to its forward or reverse positions, as indicated in full lines and in dot-and-dash lines, respectively, in Fig. 3. The slide rod 38 is adapted for manual shifting by means of a lever 39, pivotally mounted upon a support 40, having a fork end 41 embracing pins 42 carried by said shaft. Notches 43 provided in the upper side of the shaft are adapted to be engaged by a spring pressed plunger 44 to yieldably retain and determine the positions of the slide rod 38. The clutch 34 is provided at its rearward end with a toothed pinion portion 45 adapted in the reverse position, as shown in dot-and-dash lines in Fig. 3, to mesh with the reverse drive gear 46 mounted upon a shaft 47 at one side of the shaft 13, and having a pinion 48 fixed thereto and continuously meshing with the spur gear portion 29 of the driven propeller shaft gear.

The differential gearing, forming the principal feature of the present invention, operates between the driving pinion 33, mounted upon the driving shaft 13, and the driven gear 28, 29 mounted upon the propeller shaft 30, and is carried upon the countershaft 24. A large spur gear 49 is keyed upon the forward end of the countershaft 24 and meshes with the driving pinion 33, and at its rearward end, and also keyed thereto, there is mounted the epicyclic element of the differential gear train, this element comprising a cross arm 50 carrying bevel gears 51, 51 in opposed and coaxial relation, and which mesh with the bevel gear portion 28 of the driven propeller shaft gear. A spiral worm gear 52, provided at its inner end with a bevel gear portion 53 is loosely and rotatably mounted upon the countershaft 24 between the spur gear 49 and the cross arm 50, and meshes with the bevel pinions 51, 51 in opposed and complementary relation to the bevel gear 28.

The worm gear 52 meshes with a worm 54 carried upon a cross shaft 55 mounted in thrust bearings 56 and 57 provided in the side walls of the transmission housing. An electric motor 58 for rotating the shaft 55 is connected thereto by a suitable coupling 59, and is controlled by means of a rheostat 60, adapted to be operated by the driver by means of a hand lever 61 provided upon the upper end of a shaft 62, and upon the lower end of which there is provided a bevel pinion 63 meshing with a bevel segment gear 64 provided upon the movable element of the rheostat. The lever 61, or any equivalent rheostat control that it is desired to employ, is mounted within the convenient reach of the driver, and in the present disclosure, is shown as carried upon the steering column 65. The engine throttle 66 is shown as mounted in the usual manner upon the upper end of the steering column.

The shaft 55 is permitted to have a slight longitudinal motion between the bearings 56 and 57, and a plunger 67 is arranged at the end opposite the motor 58, so that when the shaft 65 moves toward or against the bearing 56, the plunger is pushed out, and this movement is utilized to make or break the motor circuit, a spring contact switch member 68 being provided in cooperative relation with the plunger 67, and electrically connected to the motor and the rheostat. In this connection, the motor operates in a clockwise direction when viewed from the commutator end, and the effort required to drive the gears causes a thrust to be developed on the worm shaft which tends to force the shaft away from the motor and break the electrical contact associated with the end of the shaft. The spring of the electrical contact is made sufficiently strong, however, to prevent the contact from being opened by this thrust. It sometimes happens, however, that a vehicle will tend to run or coast faster than its engine is driving it and at such a time the shaft 30 will become, relatively, the source of power which will be transmitted thru the differential gear train to the worm gear 54. The motor 58 is not of sufficient strength to drive the worm 54 and worm gear 52 against the force thus communicated to it, so in order to prevent injury to the motor, the means above described are provided for breaking the motor circuit by displacement of the spring contact members 68. This occurs immediately when there is any resistance to the motion of the worm gear 52 such that the shaft 55 is forced toward or against the bearing 56, thereby pushing out the plunger 67.

Another point at which the motor circuit may be broken is indicated at 69, the means for this purpose comprising a spring contact member disposed forwardly of the slide rod 38, and arranged to break the circuit when the slide rod is in the neutral and reverse positions, and to close the circuit when it is in the forward position, as indicated in Fig. 3.

The operation of my improved mechanism is as follows:

When the operator desires to move the vehicle in the forward direction, the foot pedal 22 is depressed, which disengages the friction clutch 15, and thereupon he moves the hand lever 39 to the forward position, as shown in full lines in Fig. 3, which causes the sliding clutch 34 to engage with the driving pinion 33 and establish a driving connection between the driving shaft 13 and said driving pinion, the latter driving the countershaft 24 through the spur gear 49. As the slide rod 38 moves forwardly it contacts with the switch contact element 69, closing the circuit of the electric motor and causing the worm 54 to rotate at a speed determined by the setting of the rheostat 60. It is assumed that the hand throttle 66 for the engine and the associated rheostat 60 are set so as to cause the differential worm gear 52 driven from the electric motor by the worm 55, to impart rotation to the countershaft 24 at a speed corresponding to the speed that would normally be imparted to the countershaft from the engine at a certain engine speed, say an idling speed of 300 R. P. M. The driven gear 28, 29 connected to the propeller shaft 30 does not operate at this time, as it is connected with the driving wheels of the vehicle and offers very strong resistance, as compared with the train of gears in the transmission, and consequently only the gears are operated. When the operator releases the foot pedal and causes the friction clutch to engage, no motion is transmitted to the driven gear, as the transmission gears are being operated at equivalent speeds by the electric motor. When the operator desires to move the vehicle forward he opens the throttle, causing the engine speed to increase, and since the electric motor and the associated differential gearing are being operated at a speed equivalent to 300 R. P. M. of the engine, any speed in excess of this value is transmitted to the driven gear and the propeller shaft. This results by virtue of the fact that the worm gearing is irreversible, that is, the worm gear cannot drive the worm and it can only rotate at such speeds as the electric motor allows it. In this connection the electric motor is not operating the worm gear against the force exerted on this gear by the power being transmitted, but it merely allows the worm gear to operate at certain speeds in the direction in which it is being urged, and therefore, the only effort supplied by the motor is that required to overcome the friction of the teeth of the worm gearing not overcome by the forces acting through the gearing itself, and through the design of the gearing, this is of relatively small value.

Thus, when the driving part speed is 900 R. P. M., the driven part will be driven at 900 minus 300—the latter being the R. P. M. absorbed by the differential part—or 600 R. P. M., the gear ratio being .66. As the driving part speed increases, the gear ratio also automatically increases, but not at the same rate of change.

With regard to the force acting through the worm gearing, it is the force required to drive the vehicle, the differential gearing merely acting as a movable fulcrum, the lever being the transmission and the ends of the lever having unlimited space for movement, since they are rotating parts.

The following table gives a comprehensive idea of how the present transmission gives automatic speed torque control and shows mathematically how the gear ratio of the transmission changes as the motion being transmitted through it increases. In this table only the three elements of the variable speed differential gear train are considered, these elements being the driving part or epicyclic elements 50, 51, the differential part or worm gearing 52, 54, and the driven part or gear 28, 29 carried upon the propeller shaft 30.

| Driving part R. P. M. | R. P. M. of driving part absorbed by differential part | Driven part R. P. M. | Gear ratio |
|---|---|---|---|
| 300 | 300 | 0 | .00 |
| 325 | 300 | 50 | .154 |
| 350 | 300 | 100 | .286 |
| 375 | 300 | 150 | .4 |
| 400 | 300 | 200 | .5 |
| 425 | 300 | 250 | .589 |
| 450 | 300 | 300 | .66 |
| 475 | 300 | 350 | .737 |
| 500 | 300 | 400 | .8 |

The gear ratios at the various speeds are determined by the following formula:

$$\text{Ratio} = \frac{(k_1 D_1 - K_1 D_2)}{D_1}$$

$k_1$ = gear ratio of variable speed gear = maximum possible ratio of driven to driving elements of gear. $D_1$ = R. P. M. of driving element. $D_2$ = R. P. M. of driving element absorbed by the differential element.

In the variable speed gear shown in the drawing the value of $k_1$ is two. This is readily verified by noting that the driving gears, 51, 51 mesh with the differential gear 52, 53 on one side and with the driven gear 28 on the other side. When the driving gears are carried around by the arms bearing them the teeth of these gears meshing with the differential and driven gears must also move around and carry those gears with them. One revolution of the arms bearing the driving gears will therefore produce one revolution each of the driving and differential gears or a total of two revolutions. It is not necessary for both gears to rotate and the motion may be taken up wholly or partially by either gear. When the driven gear is standing still the differential gear must rotate twice as fast as the driving element since the actual point of drive (center of driving gear) is just half way between the point which is not moving (tooth meshing with the driven gear) and the point which is moving (tooth meshing with the differential gear). Similarly when the differential gear is at a standstill the driven gear must be turning twice as fast as the driving element bearing the driving gears. The value of $k_1$ may be different for other forms of differential gears or for a different arrangement of the gears shown.

As was mentioned previously the rate at which the gear ratio changes is not constant; that is, the degree of change in gear ratio per unit change in engine speed is not the same for all speeds, or, as a matter of fact, for any two different speeds although the difference may be small at certain speeds. This characteristic of the transmission is shown clearly by means of the graph Fig. 4. The shape of the curves gives a very clear idea of the characteristics of the transmission.

Since the characteristic of a transmission of this kind is a variable which varies in mathematical ratio in accordance with the various factors causing it to function, it is similar to a mathematical equation. Mathematical equations may contain both variables and constants, and when this is the case, consideration of the variable alone does not give a complete picture of the equation. This is also true of the present transmission, and to get a complete picture of the characteristic, a constant which is usually present in automotive vehicles must be considered. This constant is the gear ratio of the final drive of the vehicle: that is, the gears connecting the transmission driven shaft with the driving wheels of the vehicle. For this reason the curves show what will be termed the absolute ratio of the vehicle transmission system, or the ratio between the speed of the engine and the speed of the driving wheels. The curves therefore show clearly what takes place in the entire transmission system, which they would not do if the action of the variable speed gear train was considered alone.

In present automotive vehicles the final drive ratios usually are a value between .2 and .222 which are usually expressed as 5 to 1 and 4.5 to 1 respectively. In order to establish a basis of comparison between present transmissions and the one disclosed herein the approximate mean of these or about 4.75 to 1 or .21 is indicated on the graph. This line represents the 'high' or direct drive ratio of the average present automotive vehicle. The second and low speed gear ratios of the present automotive vehicles are also indicated in a similar manner. The final drive of the transmission described herein will be assumed to be of such ratio as to give a condition somewhat similar to the high speed range of present vehicles, although it must be remembered that the ratios obtained in this transmission are not fixed and that the ratio changes automatically as the vehicle changes speed, and that at any speed a large number (theoretically an infinite number) of ratios are available under control of the operator.

It will be assumed that the ratio of the gears which drive the countershaft are 3 to 1 or .33 and that the final drive of the vehicle is 2.2 to 1 or .45. Then the ratio of the transmission exclusive of the final drive is $.33 \times 2 = .66$. This ratio will hereinafter be referred to as $K_1$. The operating gear ratios of the vehicle are then determined by the following formula.

$$R = .45 \times \frac{(k_1 D_1 - k_1 D_2)}{D_1}$$

wherein
$D_1$ = Speed of engine.
$D_2$ = R. P. M. of engine absorbed by differential part.
$k_1$ = Ratio of transmission exclusive of final drive.
.45 = Ratio of final drive.

The transmission characteristic curves show the gear ratio at a given engine speed, but it is also desirable to know the speed of the vehicle in miles per hour. M. P. H. curves have accordingly been included in the graph.

The characteristics of the transmission as shown by the curves will now be described. It will be assumed that the electric motor is driving the worm gearing at a speed equivalent to 300 R. P. M. of the engine. When the engine is idling at this speed no motion is transmitted to the driven gear of the variable speed gear train and the gear ratio is therefore zero. This is indicated by the curve A which shows the characteristics of the transmission when the electric motor is being operated at a speed equivalent to 300 R. P. M. of the engine. It is therefore not necessary with this transmission to disengage the gears to enable the vehicle to stand still. When the engine throttle is closed to the idling position and the vehicle brought to a stop it will remain at a standstill so long as the motor continues to idle. To start and accelerate the vehicle it is only necessary to open the engine throttle and as the engine power and speed increases the gear ratio changes from zero as indicated by the curve A. Referring to this curve it will be seen that as the vehicle and engine gain speed the gear ratio increases until at 5 M. P. H. the gear ratio is .11, at 10 M. P. H. it is .16, at 20 M. P. H. about .21 or the same gear ratio as obtained in the high gear of present vehicles. As the speed increases above this point the gear ratio increases. Due to this it would be possible to operate the vehicle at a speed of 60 M. P. H. with an engine speed of 2340 R. P. M. This is a very desirable characteristic as high speeds greatly shorten the life of an engine, and since the speed of most engines is definitely limited, the speed of the vehicle is accordingly limited.

The average touring speed is about 35 M. P. H. which is a gear ratio of about .24, or as usually expressed, 4.17 to 1 along curve A. For level country this would be satisfactory, but in ascending a grade this ratio would probably be too high and consequently the vehicle would lose speed. As the speed decreased, the gear ratio would also decrease along curve A until the vehicle no longer lost speed, at which point it would remain until the grade changed. It is apparent from this that the action of the transmission is automatic and that the vehicle would ascend any grade without any action on the part of the operator to control the transmission.

It may, however, be desirable to ascend the grade at a higher speed than allowed by curve A. Suppose that to ascend a grade along curve A it would be necessary to drop back to 20 M. P. H. or a gear ratio of .21, but that it is desired to ascend at a speed of 30 M. P. H. It will be noted that a gear ratio of .2 is obtained on curve C. at 30 M. P. H. To obtain this condition it is only necessary to increase the speed of the electric motor until it is equivalent to 500 R. P. M. of the engine. Since the speed of the motor is under the control of the driver the characteristic curve along which the transmission will operate may be shifted at will to give the desired speed and gear ratio.

It will be understood, of course, that the characteristics of the transmission are not limited to those shown, as different designs of the transmission gear train, within the scope of the present conception, will result in different characteristics. In my co-pending application, above referred to, S. N. 175,035, I have shown different arrangements of the differential gear train, that is, in which the epicyclic element is either the driving, driven, or control element connected to the electric motor, and analogous modifications may be resorted to in the present invention. I have also shown in said application an embodiment in which reversible worm gearing is substituted for the irreversible gearing, the motor being replaced by a generator or other form of regulable brake, and the present conception also contemplates a similar substitution.

I have illustrated and described a preferred and satisfactory embodiment of the invention, but it will be obvious that changes may be made therein, within the spirit and scope thereof, as defined in the appended claims.

Having thus described my invention, what I claim and desire to secure by Letters Patent is:

1. In a transmission mechanism for motor vehicles, a prime mover, a drive shaft adapted to be driven thereby, a countershaft adapted to be driven by said drive shaft, a driven shaft coaxial with said countershaft, a differential gear train comprising a driving element, a controllable element, and a driven element, said driven element being carried by said driven shaft, said driving element being connected to said countershaft and said controllable element being mounted for independent rotation with respect to said countershaft, and independently controllable means for actuating said controllable element whereby said countershaft is driven at a speed corresponding to a given speed of said prime mover and whereby such given speed is absorbed and speed of said prime mover in excess of said given speed is transmitted to said driven shaft.

2. In a transmission mechanism for motor vehicles, a prime mover, a driven element, a differential gear train operatively connecting said prime mover and said driven element, manually operable means adapted to connect and disconnect said differential gear train with respect to said prime mover, a motor adapted to operate said gear train at a speed corresponding to a given speed of said prime mover and whereby such given speed is absorbed and speed of said prime mover in excess of said given speed is transmitted to said driven element, and switching means adapted to close the circuit of said motor upon operation of said connection means to connect said prime mover and said differential gear train and to open the circuit upon operation of said means to disconnect said prime mover and said differential gear train.

3. In a transmission mechanism for motor vehicles, a prime mover, a driven element, a differential gear train operatively connecting said prime mover and said driven element including a worm gear, an electric motor driven worm in engagement therewith and having axial thrust, said motor adapted to operate said gear train at a speed corresponding to a given speed of said prime mover and whereby such given speed is absorbed and speed of said prime mover in excess of said given speed is transmitted to said driven element, and means operable by the axial thrust of said worm adapted to make and break the motor circuit.

Signed at New York, county of New York, and State of New York, this 30th day of April, 1927.

FRANCIS P. ELLSWORTH.